Jan. 30, 1940.  E. L. EMMONS  2,188,502
METHOD OF AND APPARATUS FOR MAKING PATTERNS
Filed July 14, 1937  4 Sheets-Sheet 1
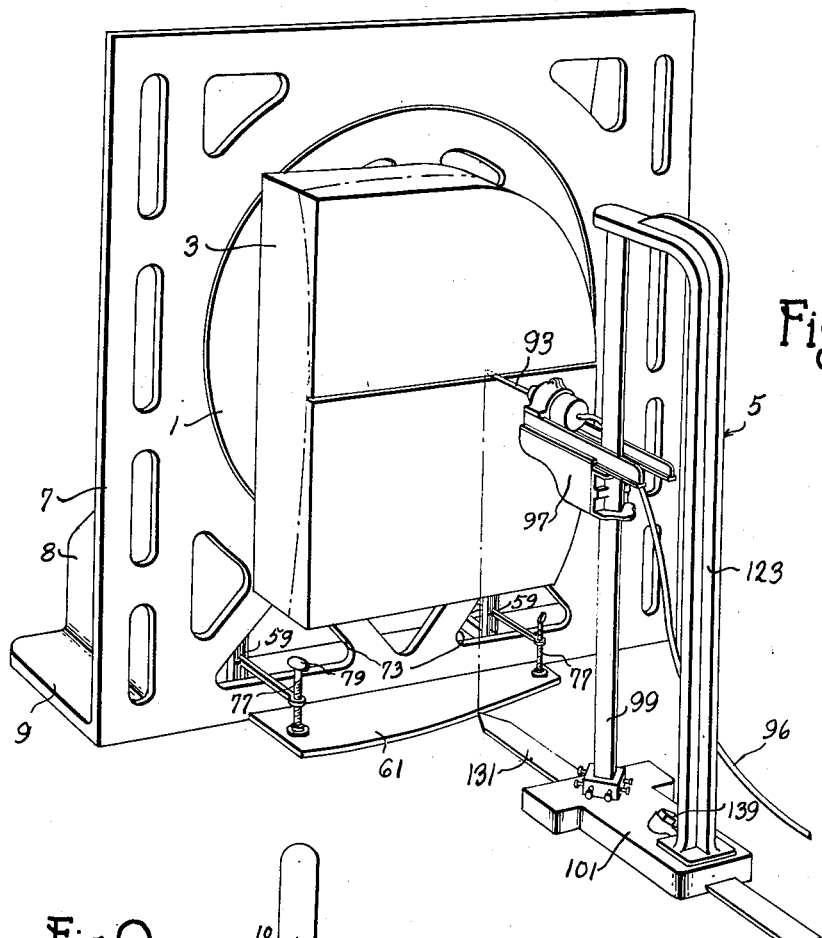
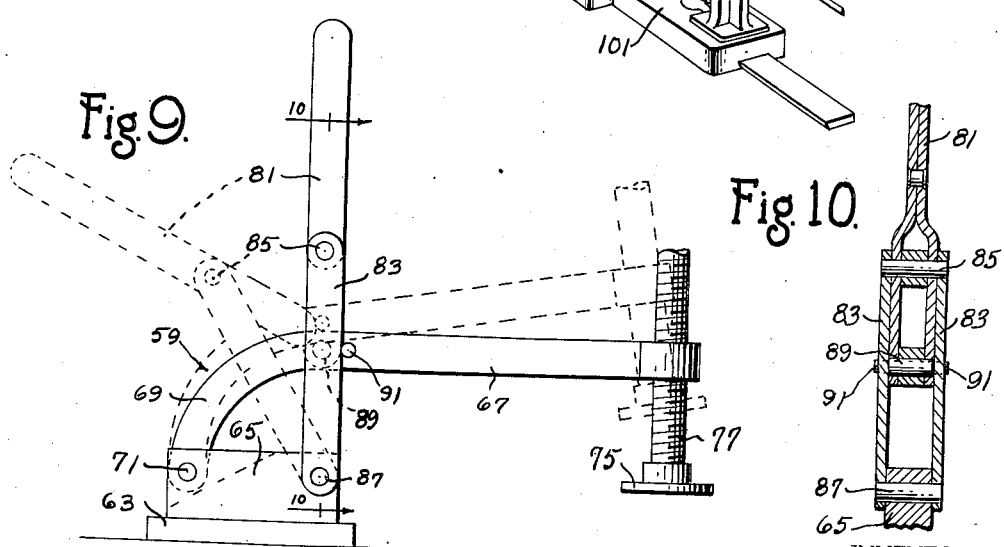
INVENTOR.
Eric L. Emmons
BY
ATTORNEY.

Jan. 30, 1940. E. L. EMMONS 2,188,502
METHOD OF AND APPARATUS FOR MAKING PATTERNS
Filed July 14, 1937 4 Sheets-Sheet 2

INVENTOR.
Eric L. Emmons
BY
Ralph S. Burns
ATTORNEY.

Jan. 30, 1940. E. L. EMMONS 2,188,502
METHOD OF AND APPARATUS FOR MAKING PATTERNS
Filed July 14, 1937 4 Sheets-Sheet 4
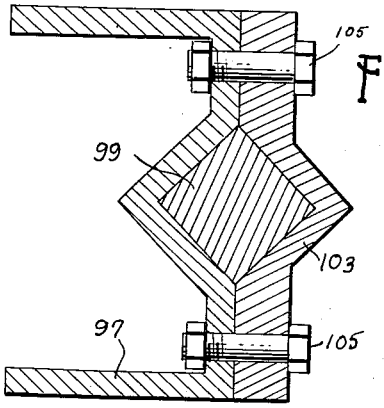
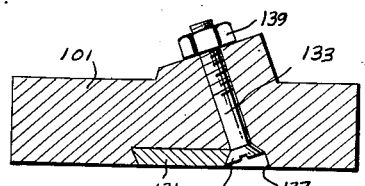
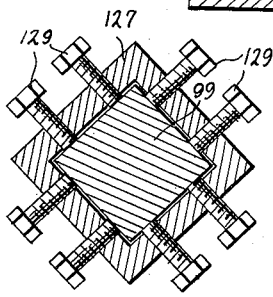
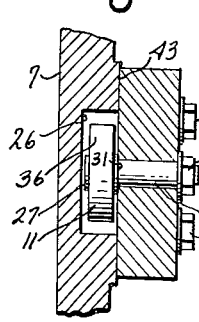
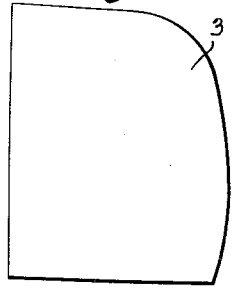
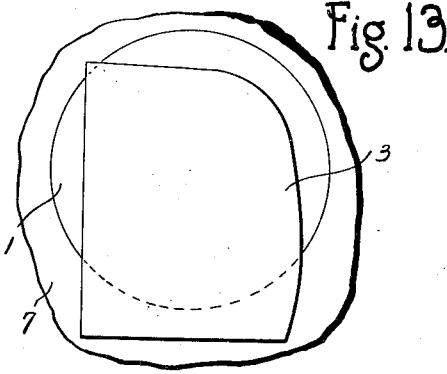
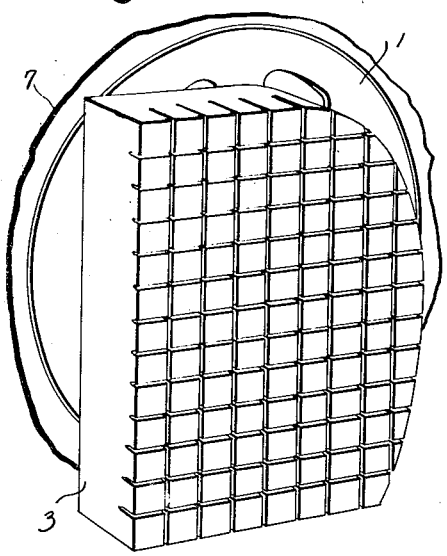
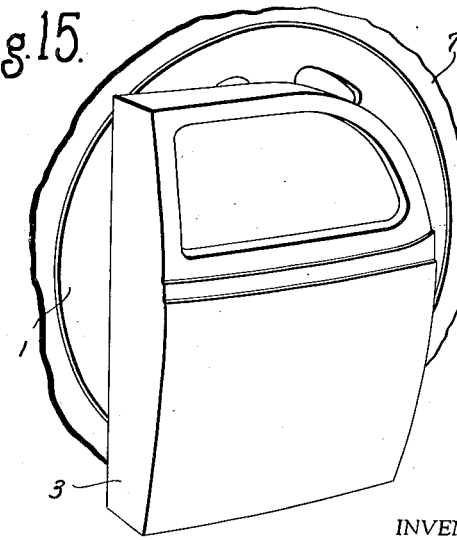
INVENTOR.
Eric L. Emmons
BY
ATTORNEY.

Patented Jan. 30, 1940

2,188,502

UNITED STATES PATENT OFFICE 2,188,502

METHOD OF AND APPARATUS FOR MAKING PATTERNS

Eric L. Emmons, Detroit, Mich.

Application July 14, 1937, Serial No. 153,640

4 Claims. (Cl. 144—144)

My invention pertains to an improved method of and apparatus for shaping wood and other materials for model, pattern making, art work and the like. The method of forming material herein disclosed is claimed in my copending patent specification Serial Number 279,881, filed June 19, 1939.

It is an object of my invention to provide a method for working down a surface to a predetermined curvature with improved speed, accuracy and convenience.

It is also an object of my invention to provide an adjustable holding apparatus for conveniently receiving and supporting work material and templates in definite predeterminable positions for cutting by a relatively movable cutter which simultaneously engages both the work and the templates.

Further objects and advantages coming within the scope of my invention, such as relation to the arrangement, operation and function of the related elements, to various details of construction and to arrangements of parts, elements per se, and to economies of manufacture and numerous other advantages will be apparent from a consideration of the specification, in conjunction with the drawings, disclosing specific embodiments, in which:

Fig. 1 is a perspective view showing the complete arrangement of my device in operative relation;

Figs. 6, 7, 8 are sectional views on the respective lines 6—6, 7—7, and 8—8 of Fig. 2;

Fig. 9 is a side elevational view showing one of the template clamps on the machine in closed and opened positions;

Fig. 10 is a sectional view on line 10—10 thereof;

Fig. 11 is a sectional view on line 11—11 of Fig. 2;

Fig. 12 is an elevational view showing a portion of work material to be shaped;

Fig. 13 is an elevational view showing the work material mounted upon a rotatable platen of my adjustable work holding machine;

Fig. 14 is a perspective view showing the work material having the guiding grooves cut across the surface in criss-cross relation; and Fig. 15 is a perspective view showing the piece of work material after the surface has been worked down to the bottoms of the guiding grooves to provide a surface of the desired curvature.

Figure 2:
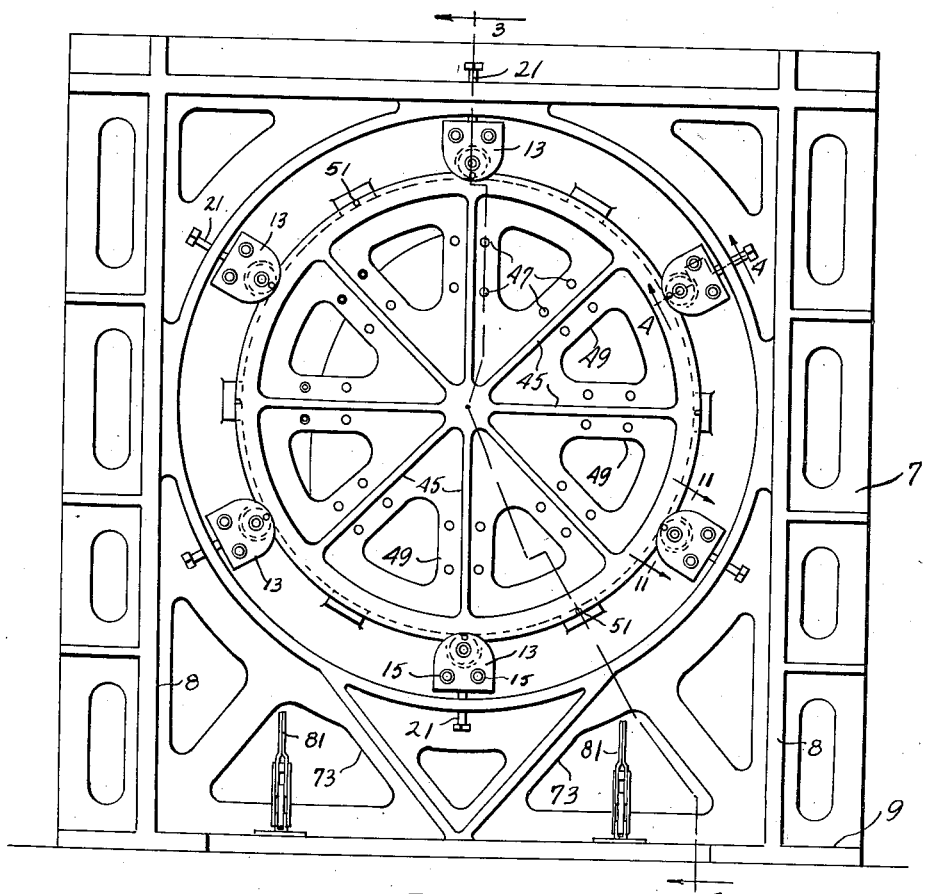
Fig. 2 is a rear elevational view showing the back of my adjustable work material holding machine.
Figure 3:
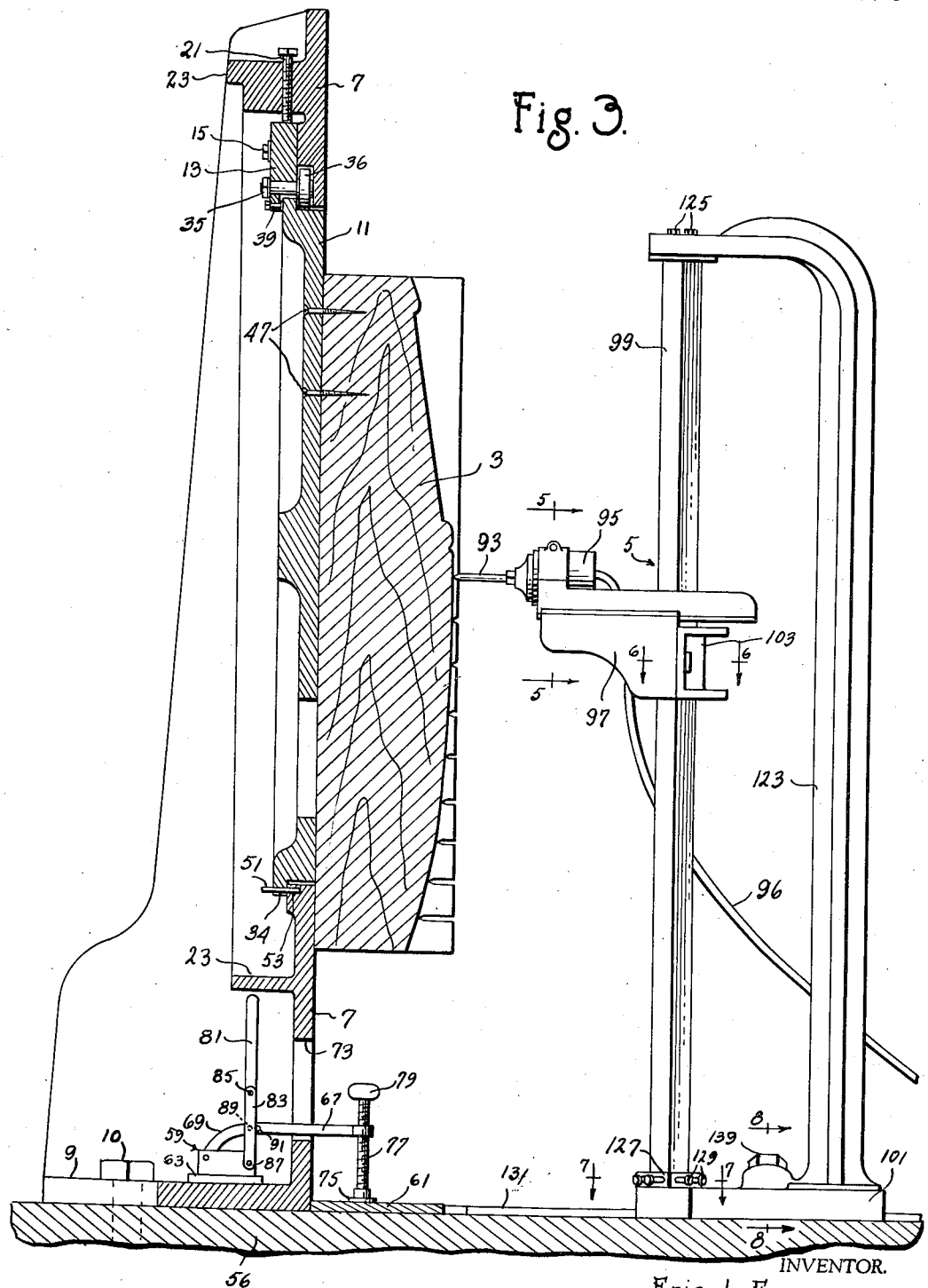
Fig. 3 is a vertical sectional view on line 3—3 of Fig. 2.

Referring more specifically to Figs. 1, 2 and 3 of the drawings, my adjustable work material holding machine comprises a movable platen 1 for supporting a piece of work material 3 in predetermined adjustable positions for working by means of a motorized cutter 5. For this purpose I provide a platen 1 of substantially circular or disc like conformation which is rotatively supported in an upright position in a circular aperture in a broad plate 7 which is supported in a substantially vertical position by a perpendicularly extending base 9. The vertical plate 7 is preferably square or rectangular and it is cast of any suitable metal having stiffening ribs 8 on the back to provide a rigid construction with open portions to decrease the weight.

Figure 4:
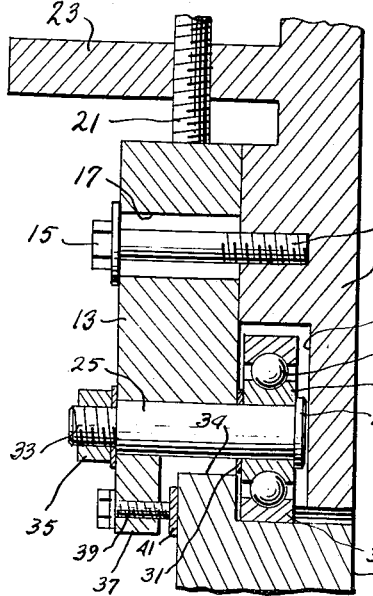
Fig. 4 is a sectional view on line 4—4 of Fig. 2.

The aperture in which the circular platen wheel 1 is mounted is of a slightly larger diameter than the platen in order to provide sufficient clearance for free movement. To provide a friction free support for the platen, the vertical plate 7 of the machine is provided with a plurality of roller bearings 11 which are supported by adjustable bearing blocks 13 secured on the back of the vertical plate 7, as shown more clearly in Figs. 2, 3, and 4. Each adjustable bearing block 13 is secured by two anchor screws 15 which pass through slotted apertures 17 for threadable reception in threaded apertures 19 in the main plate 7 of the machine. The anchor screws 15 screw into plate 7 substantially parallel to the axis of rotation of the platen wheel 1, and may be tightened upon the block 13 for locking it in adjusted positions. Each bearing block 13 may be adjusted by means of an adjusting screw 21 which passes threadably through an annular flange 23 projecting rearwardly from the vertical plate 7. For supporting the roller bearing 11, a bearing pin 25 extends through the inner portion of the bearing block 13 into an aperture 26 in the main plate 7, and comprises a head 27 which holds the inner race 29 of the bearing 11 toward the block 13 in spaced relation against a washer 31, as shown in Fig. 4. At its rearwardly extended end the bearing pin 25 comprises a threaded portion 33 of a reduced diameter for receiving a threaded nut 33 for securing the bearing pin firmly in position in the bearing block.

The circumferential edge of the platen wheel 1 is disposed for rolling upon the outer race 36 of the roller bearing. The platen may be freely rotated to turn the work material to any desired position. On the edge of the platen wheel and adjacent the rear surface thereof, I provide a flange 34 of larger diameter for guiding the wheel 1 relative to the roller bearings. On the inner end of each radially extending bearing block 13, I provide an inwardly extending portion 37 which is substantially thinner than the main portion of the bearing block for extending adjacent the thin flange 34 projected on the platen wheel. I also provide an adjustable friction screw 39 which extends threadably through the extended portion of the block for pushing a friction pad 41 against the rear surface of the flange 34 of the platen wheel.

It will be seen that by loosening the anchor screws 15 of the various bearing blocks 13 these may be adjusted radially by turning the adjusting screws 21. By thereafter turning down the anchor screws 15 the anchor blocks 13 may be firmly locked. In order to distribute the strain of the clamping pressure uniformly, and to prevent the block binding unduly, I provide pressure distributing pads 43 projecting slightly from the vertical plate 7 on opposite sides of the roller bearing 11, as shown more clearly in Fig. 11.

The platen wheel 1 is preferably made of suitable cast metal comprising ribs or spokes 45 extending radially in order to provide a rigid construction. For supporting the blocks of work material upon the face of the platen wheel, screws 47 may extend through suitable apertures therein. The platen wheel may also be provided with large apertures 49 between the spokes 45 to decrease the weight of the wheel, and to provide additional apertures for the receiving bolts, screws or other fastening means to fasten the work material.

To accurately determine the various angular positions to which the platen wheel 1 can be turned, I provide latch-pins 51 (see Fig. 2) which may extend through suitable apertures through the extended rim 34 of the platen wheel to plug into suitable socket apertures 53 spaced around the circular aperture in the vertical plate 7 (see Fig. 3). By providing two such socket apertures in diametrically opposed positions it is possible to turn the platen wheel precisely through an angle of 180° and to thereafter latch it accurately in position. It will be readily understood that by providing any desired number of socket apertures 53 in the rim of the circular aperture in the vertical plate 7, the platen wheel may be turned accurately and latched in any number of different angular positions as desired.

My adjustable work holding machine is installed for use by mounting it upon a bench or table 56 having a smooth plane surface. For this purpose the base 9 is secured firmly to the top of the bench by any suitable fastening means such as bolts or screws 10. My machine is provided with quick releasable clamps 59 mounted on the base 9 of the machine and projecting through to the front side 7 for firmly securing templates or patterns 61 against the front surface of the machine and the bench top 56, for a purpose to be subsequently set forth. Each of the quick releasable clamps 59 comprises a base 63 with a bracket lug 65 rising therefrom, as shown in Fig. 9. The base 63 is secured to the base 9 of the machine in any suitable manner. A clamp lever 67 has a curved end portion 69 which is pivotally secured to one end of the bracket lug 65 on a pivot pin 71 extending through both. Because of the curved portion 69, the straight portion of the clamp arm 67 leans over the base 63 and projects through an aperture 73 in the vertical plate 7 to the front of the machine.

The front projected end of the clamp lever 67 carries a pattern depressing tab 75 on the lower end of an adjusting screw 77 which screws vertically through the lever. On the upper end of the adjusting screw 77 a thumb wing 79 is provided to facilitate adjustment of the position of the pattern engaging tab 75 toward or away from the table top on which the machine is mounted.

For quickly raising or depressing the clamp lever 67, I provide a toggle mechanism comprising a hand lever 81 which is pivotally connected between a pair of link straps 83 on a pivot pin 85 passing through an intermediate portion of the handle 81 and the upper ends of link straps. The lower ends of the link straps 83 pass on opposite sides of the bracket lug 65 to which they are pivotally joined by a pivot pin 87 which extends through the front end of the lug. The lower end of the handle 81 is pivotally joined to the clamp lever 67 which passes through between the strap links 83 by a pivot pin 89 which terminates flush with the outer surfaces of the lever to pass freely between the link straps 83.

As shown in full line position in Fig. 9, the clamp lever 81 is depressed, as for holding a template. To quickly lift the lever 67 and release the template it is only necessary to turn the handle 81 to the dotted line position, as shown in Fig. 9, when the hand lever 81, pivoting on the intermediate pivot pin 85 as a movable fulcrum, lifts the clamp lever 67 to which it is pivotally connected. To reclamp it, it is only necessary to straighten up the handle 81 to the full line position shown. To prevent movement past center, a stop pin 91 extends transversely from opposite sides of the clamp lever 67 of sufficient length to engage the link straps 83. The stop pin 91 is preferably so disposed that the handle 81 may be moved slightly beyond its center position for permanent holding.

By providing two clamps 59 projecting through spaced openings 73 in the front plate 7, templates or patterns are firmly secured against the table top and the front plate. To accommodate patterns of different thickness it is only necessary to adjust the thumb screws 77 in the ends of the clamp levers. Thus a great many different templates can be very quickly changed for working different portions of the work material.

For cutting the surface of the work, in accordance with the templates or patterns, I provide a motorized cutter 5 comprising a cutting point 93 driven by a small electric motor 95 upon the extended shaft of which it is mounted. The motor 95 is energized through a suitable cable 96.

To support the motor and the cutter for convenient adjustment to different vertical distances above the bench, the motor is supported upon a carriage 97 which clamps to a guide rail or bar 99 supported vertically from a base 101. As shown more clearly in Fig. 6, the vertical guide bar 99 is of non-circular conformation, preferably square, and a clamp fixture 103 of suitable conformation is clamped by bolts 105 to the rear end of the motor carriage. The clamp fixture has a recess of a suitable conformation for firmly clamping the guide bar. To adjust the vertical position of the motor it is only necessary to loosen one of the clamp bolts 105, by application of a suitable wrench. After adjusting the carriage, the clamp 103 is again tightened.

Figure 5:
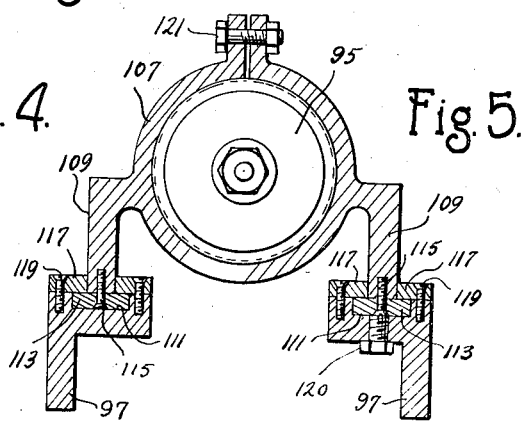
Fig. 5 is a transverse sectional view through the motorized cutter and its supporting bracket, as indicated on line 5—5 of Fig. 3.

For adjusting the motor and cutter horizontally toward or away from the square guide bar 99, the motor is secured in a split clamp 107 which is supported between spaced runners 109 which, as shown in Fig. 5, extend horizontally for sliding in parallel spaced guide grooves 111 in the upper edges on opposite sides of the carriage 97. The bottoms of the runners 109 are provided with flat slide strips 113 which are wider than the runners and which are secured thereto by upwardly directed screws 115. For holding the slides in the guide grooves, retaining strips 117 are secured in overlapping relation on the upper edges of the carriage as by screws 119. Adjusting bolts 120 are provided in the carriage portion 97 to clamp against the slide strips 113 in order to secure the motor in any given position. The motor 95 is clamped in the split sleeve 107 by a clamping bolt 121 through the split ends thereof.

For supporting the square guide bar 99 vertically on the bore 101, a rigid goose neck standard 123 rises therefrom for receiving and securing the upper end of the bar by means of suitable screws 125. The lower end of the guide bar seats into a socket enclosed by a square flange 127 rising from the base, shown in Fig. 7. The socket is substantially larger than the cross-section of the guide bar 99 to provide for lateral movement of the end of the bar therein. To adjustably move and secure the lower end of the guide bar 99 in the socket, I provide a pair of screw bolts 129 extending into the socket through each side thereof for engaging the sides of the end of the guide bar. By properly setting the screws 129 the guide bar can be adjusted for vertical alignment much more precisely than could be economically accomplished during the manufacture of the base and the goose neck standard.

To follow the curvature of the template 61 and guide the cutter point, I provide a pointed feeler bar 131 which passes slidably through a suitable groove in the bottom of the base 101 with the pointed end projecting out in vertical alignment with the cutter point 93, as shown in Figs. 1 and 3. By sliding the feeler bar 131, it is adjusted to proper vertical alignment with the point. The feeler bar is then locked in the base by a bolt 133 which, as shown in Fig. 8, passes through the base with its tapered head 135 embedded in a suitable aperture 137 in the bottom of the base 101 for gripping the edge of the feeler bar 131 with a wedging action. The other end of the bolt 133 projects above the upper surface of the base 101 to receive a nut 139 by which it is secured for holding the feeler.

In the operation of my apparatus, a block of the material to be worked, as shown in Figs. 12 and 13, is secured upon the face of the platen-wheel 1. The work material is secured to the platen wheel 1 and the platen is turned and rigidly secured in a proper angular position, as previously described.

For working the surface of the work material, a set of the templates or patterns 61, is obtained, which have a curvature corresponding to the curvatures of the surface to be reproduced, measured along substantially parallel guide lines taken at predetermined spaced distances. Each template 61 corresponds to the curvature of the desired surface along one of the predetermined guide lines, and the different templates may be suitably marked or otherwise identified with the corresponding guide line. As will be readily understood, the curvature of the different templates may be variously obtained as by mathematical computation, by measuring a model which is to be reproduced, or by other empirical methods.

The cutting point 93 is adjusted to a vertical distance above the table top 8 which corresponds to a certain one of the guide lines. A template, which has the corresponding curvature, is then selected and clamped under the quick releasable clamps 59 which hold it firmly against the front face 7 of the machine and the table top 8, as previously described.

As the cutter point 93 is driven by the electric motor, it is moved to traverse the face of the block of work material. This is accomplished by sliding the base 101 over the smooth table top and at the same time the point of the feeler bar 131 is held in firm engagement against the curved edge of the pattern 61. This causes the point 93 to cut a guide groove, the bottom of which has a curvature corresponding to the curvature of the edge of the pattern which is the curvature of the desired surface along a corresponding guide line. The depth of the groove then corresponds to the thickness of material which is to be removed from the face of the work material.

The cutter point 93 is now adjusted to a different vertical distance from the table top corresponding to a different guide line, in a manner previously described. The template 61 is now released from the quick releasable clamps 59, and another template is inserted which corresponds to said different guide line. The operation is now repeated by moving the cutting point 93 to traverse the face of the work material and cut a second guide groove which is parallel to, and spaced from, the first guide groove. This operation is successively repeated to cut a set of parallel spaced guide grooves which correspond in depth to the thickness of the material which must be removed from the work material at points along the guide lines to produce a surface of the desired curvature, as shown in Fig. 3.

In order to provide additional guide points, the work material is turned to a different angular position. This is accomplished by releasing and turning the platen wheel 1 in the manner previously described. By means of the latching pin 51 in the socket apertures 53, the platen wheel 1 can be precisely turned and latched in the proper angular position.

A set of templates is now selected corresponding to the curvature of the desired surface along guide lines taken in a corresponding angular position. By repeating the grooving operations above described, a second set of parallel spaced guide grooves is cut across the face of the work material angularly to and intersecting the first set of grooves. A block of work material with two sets of guide grooves disposed perpendicularly is shown in Fig. 14. As shown the grooves are narrower than the spaces between the grooves.

The block of work material is now removed from the platen wheel 1 and the entire surface thereof is worked down flush with the bottom of the guide grooves. This is accomplished in any suitable manner according to the work material, as will be readily understood, and provides the surface having the curvature desired, as shown in Fig. 15 for example. The surface will be thereafter suitably finished.

It is apparent that within the scope of the invention, modifications and different arrangements and operations may be made other than herein disclosed, and the present disclosure is illustrative merely, the invention comprehending all variations thereof.

I claim:

1. An adjustable work holding machine comprising, a platen wheel for holding work material, platen support means for rotatably supporting said platen wheel in a substantially vertical position above a substantially horizontal plane surface, a motorized cutter, cutter support means for supporting said motorized cutter slidably on the plane surface and spaced therefrom, and quick releasable clamp means for securing templates firmly on the plane surface and rigidly against said support means for precisely guiding the movements of said cutter support means on said surface.

2. An adjustable work holding machine comprising, a platen wheel for holding work material, platen support means for rotatably supporting said platen wheel in a substantially vertical position above a substantially horizontal plane surface, a motorized cutter, adjustable cutter support means for supporting said motorized cutter slidably on the plane surface and adjustably spaced therefrom, and quick releasable clamp means for securing templates firmly on the plane surface and rigidly against said support means for precisely guiding the movements of said cutter support means on said surface, and latching means on said platen support means for locking said platen wheel precisely in predetermined angular positions.

3. An adjustable work holding apparatus comprising, a platen wheel for holding work material, a substantially vertical plate having a circular aperture for receiving the periphery of said platen wheel, bearing means on said plate disposed for engaging the periphery of said platen wheel, a base at the back of said plate for supporting the plate substantially vertically on a horizontal plane surface, apertures in said plate, and quick releasable clamps secured on said base and projecting through the apertures to the front of the plate for securing templates on the surface on which the base rests and against the front surface of said plate for guiding the movement of a tool applied to the work material.

4. An adjustable work holding apparatus comprising, a platen wheel for receiving and holding a piece of work material, a support plate having a circular aperture for receiving the periphery of said platen wheel to support it in the plane of said support plate, a base extending from the lower portion of said support plate for mounting it on a plane surface, roller bearings on said plate disposed for engaging the periphery of said platen wheel, means for mounting said roller bearings movably on said plate for adjustment toward or away from the platen wheel, friction means for frictionally engaging said platen wheel to resist rotation thereof, and precision latching means for firmly securing said platen wheel in predetermined angular positions.

ERIC L. EMMONS.